Patented Sept. 19, 1922.

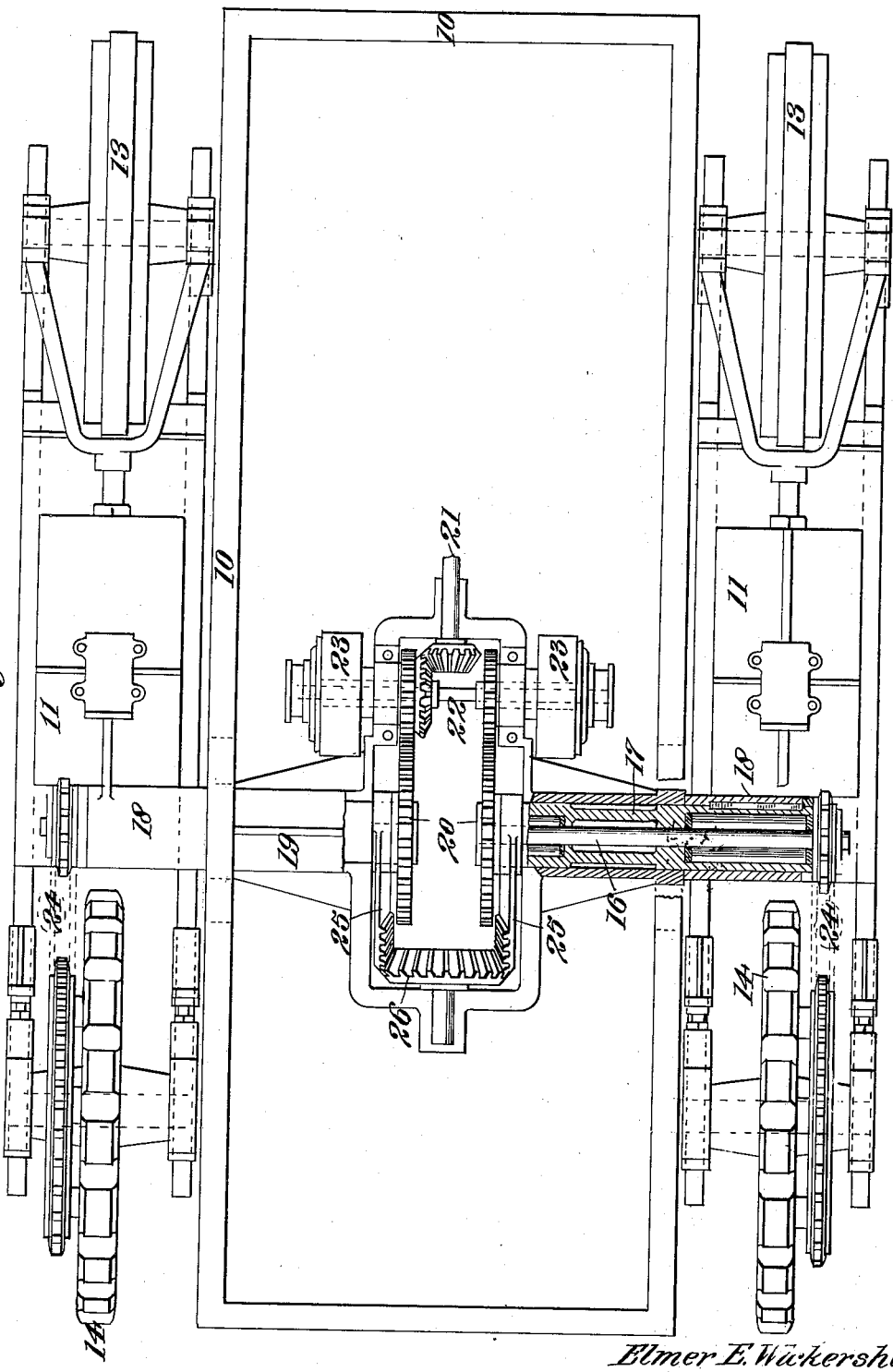

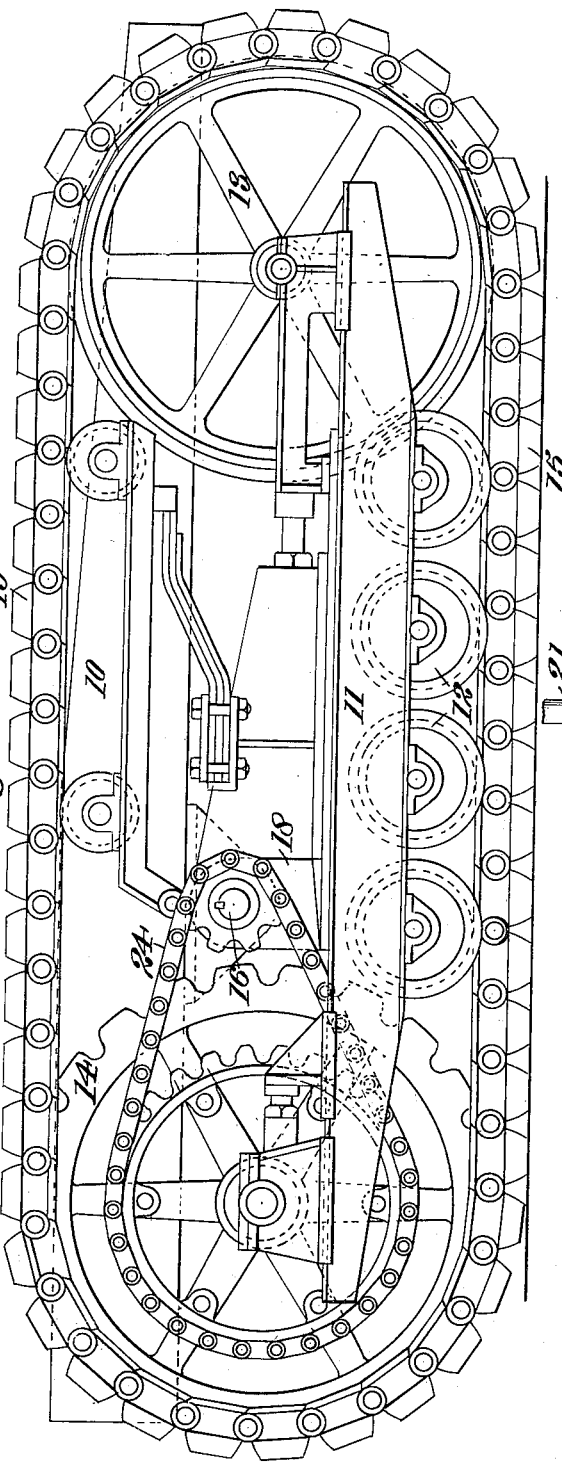
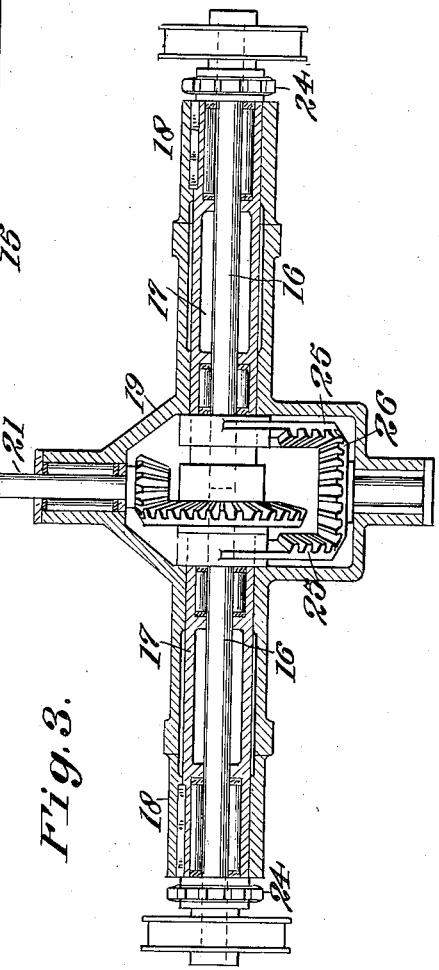

1,429,474

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-FRAME SUSPENSION.

Application filed September 29 1919. Serial No. 327,284.

*To all whom it may concern:*

Be it known that I, ELMER E. WICKERSHAM, a citizen of the United States, residing at Stockton, in the county of San Joaquin and State of California, have invented new and useful Improvements in Tractor-Frame Suspensions, of which the following is a specification.

This invention relates to tractors of the chain track type, and more particularly to means for suspending the main frame on the truck mechanisms.

In my prior application, Serial No. 314,205, filed July 30th, 1919, I show and describe a support for the main frame having a single point of connection with each truck mechanism. The mechanism illustrated therein comprises a supporting axle placed forwardly of the driving axle and connected to the truck mechanism. The driving sprocket wheels for the chain track are journaled directly on the main frame. The supporting axle is divided and a differential mechanism placed therein for stabilizing the main frame.

The present invention relates to the same general method of supporting a main frame at a single point on each truck mechanism, but having a different operation and offering advantages in the way of simplicity and adapting the supporting means to a truck mechanism having a rigid frame on which are journaled both the driving sprocket wheel and the idler sprocket wheel. The driving axle for the driving sprocket wheels constitute the center about which the truck frames rock and the housing for said driving axle constitutes the supporting means for the main frame. Means are interposed in the supporting connections for imparting equal opposite movements to the truck frames.

Referring to the accompanying drawings:

Fig. 1 shows a plan view of a device embodying my invention.

Fig. 2 shows a side elevation of the same.

Fig. 3 shows a sectional view of the driving and supporting connections.

The tractor herein shown comprises a main frame 10 at each side of which is a self-laying track truck mechanism, each made up of a rigid truck frame 11 on which are journaled supporting rollers 12 and at the forward end of which is an idler sprocket wheel 13. A toothed sprocket wheel 14 is journaled on the rear end of the truck frame and in no way connected with the main frame. An endless chain track 15 is carried by the driving and idler sprocket wheels and forms a track for the rollers 12.

For driving the sprocket wheels 14 and supporting the main frame upon the truck mechanisms I provide the following arrangement: A divided shaft 16 is arranged forwardly of the sprocket wheels 14 and journaled in a divided sleeve 17. This divided sleeve at its outer ends is keyed to a bearing 18 on the adjacent truck frame 11. A housing 19 is formed on the main frame and encloses the sleeve 17 and the driving gears 20 for the drive shaft 16. For operating the gears 20 I provide a propeller shaft 21 connected by gearing to a clutch shaft 22 on which are arranged two clutch mechanisms 23 independently controllable and having their driving members connected each to a different gear 20 so that one end of the divided shaft 16 may be thrown out of gear, while the other one is in operation for the purpose of steering and turning the tractor. The outer end of each part of the drive shaft 16 is connected by a chain and sprocket 24 to the adjacent driving sprocket wheel 14. On the inner end of each part of the sleeve 17 is a mutilated bevel gear 25 and meshing with both bevel gears 25 is an intermediate bevel gear 26, the latter being journaled on the housing 19.

In the operation of the tractor, the main frame will be held against tilting on the sleeves 17 by reason of the interlocking connection formed by the intermediate gear 26. Each truck mechanism will be free to rock about the axis formed by the sleeve 17, but, on account of the gears 25 and 26, an upward movement of the forward end of one truck mechanism will not impart a downward movement of the forward end of the opposite truck mechanism.

When one truck strikes an obstruction and thereby is raised at its forward end the tendency will be to depress the opposite truck due to the action of the gears 25 and 26, but the opposite truck cannot be depressed at its forward end on account of its contact with the ground. Consequently, the gears 26 will be revolved about the axis of the gears 25 in the manner of a differential gearing. The effect of this will be to raise the main frame forward of the axis 16 bodily to an extent of one-half that of the upward movement of the truck mechanism. At the same time the rear end of the main frame will be depressed, the entire main frame rocking about the axis 16 and carrying with it the gear 26.

The divided sleeve 17 has a long bearing in the housing 19, and, consequently, it will serve to support the entire weight of the main frame without imposing any strains upon the driving shaft 16.

Having thus described my invention, what I claim and desire to secure by Letters Patent is:

1. In a vehicle, a main frame, a chain track truck mechanism at each side, means for supporting the entire weight of the main frame at a single point on each truck mechanism, and connections included in said supporting means for stabilizing the main frame and causing equal opposite movements of the truck mechanisms about their points of connection with the main frame.

2. In a tractor, a main frame, a truck mechanism at each side thereof, each truck mechanism including a roller truck frame on which are journaled a driving and an idler sprocket wheel, a driving axle for the sprocket driving wheels carried on the main frame and a supporting connection concentric with the driving axle carrying the entire weight of the main frame on the roller truck frames and means included in said supporting connection for causing equal and opposite movements of the truck mechanisms about their points of connection with the main frame.

3. In a tractor, a main frame, a chain track truck mechanism at each side thereof, a driving axle for the chain track and a housing for the axle serving to support the entire weight of the main frame on the truck mechanisms, and means carried upon said housing for causing equal and opposite movements of the truck mechanism about their points of connection with the main frame.

4. In a tractor, a main frame, a chain track truck mechanism at each side thereof, a driving axle for the chain track, a housing for the axle serving to support the entire weight of the main frame on the truck mechanisms, said truck mechanisms being pivoted for rocking movement about the driving axle and means interposed between opposite truck mechanisms for imparting equal opposite movements thereto.

5. In a vehicle, a main frame, a chain track truck mechanism at each side thereof, means supporting the main frame at a single point on each truck mechanism intermediate the ends of the latter and permitting rocking movement of the truck mechanisms, and means causing the truck mechanisms to rock equally in opposite directions.

6. In a tractor, a main frame, a chain track truck mechanism at each side thereof, a divided axle forming a pivot for each truck mechanism and turnable therewith, bevel gears on the inner ends of the divided axle and an intermediate gear meshing with said bevel gears and carried on a fixed support to cause opposite turning movement of the truck mechanisms.

7. In a tractor, a main frame, a chain track truck mechanism at each side thereof, a divided axle forming a pivot for each truck mechanism and turnable therewith, bevel gears on the inner ends of the divided axle, an intermediate gear meshing with said bevel gears and carried on a fixed support to cause opposite turning movement of the truck mechanisms, said axle forming the only support for the main frame, said intermediate gear being mounted on the main frame and serving to stabilize the latter.

8. In a tractor, a main frame, a chain track truck mechanism at each side thereof, means to support the main frame at a single point on each truck mechanism comprising a divided sleeve forming a pivot for each truck mechanism and turnable therewith, a bevel gear on the inner end of each part of the divided sleeve, an intermediate gear meshing with both bevel gears and journaled on the main frame and a drive shaft for the chain track carried within said divided sleeve.

In testimony whereof I have hereunto set my hand in the presence of two subscribing witnesses.

ELMER E. WICKERSHAM.

Witnesses:
W. W. HEALEY,
J. W. HERRING.